Figure 1:
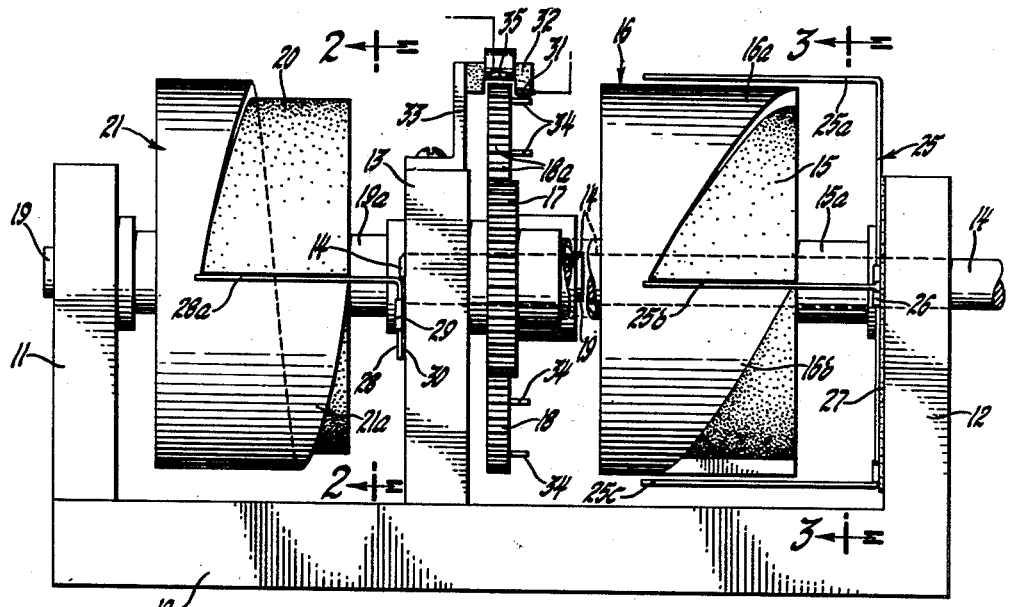

Aug. 31, 1954 W. E. SARGEANT ET AL 2,688,127
COMBINED SPARK IMPULSE INDICATOR
Filed Jan. 30, 1951 5 Sheets-Sheet 1

Inventors
Walter E. Sargeant &
Edward F. Weller, Jr.
By Willitz, Helmig & Baillio
Attorneys Aug. 31, 1954 W. E. SARGEANT ET AL 2,688,127
COMBINED SPARK IMPULSE INDICATOR
Filed Jan. 30, 1951 5 Sheets-Sheet 2
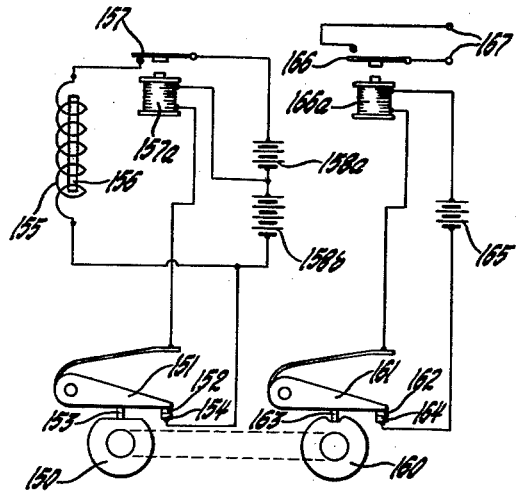
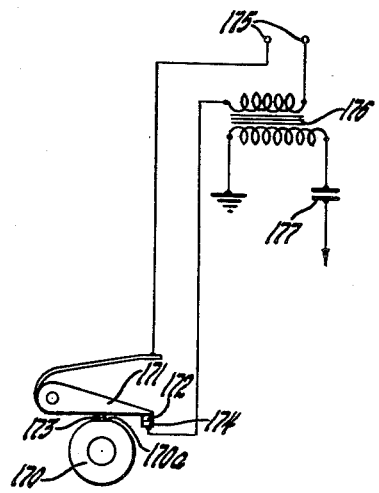
Fig. 4  Fig. 5
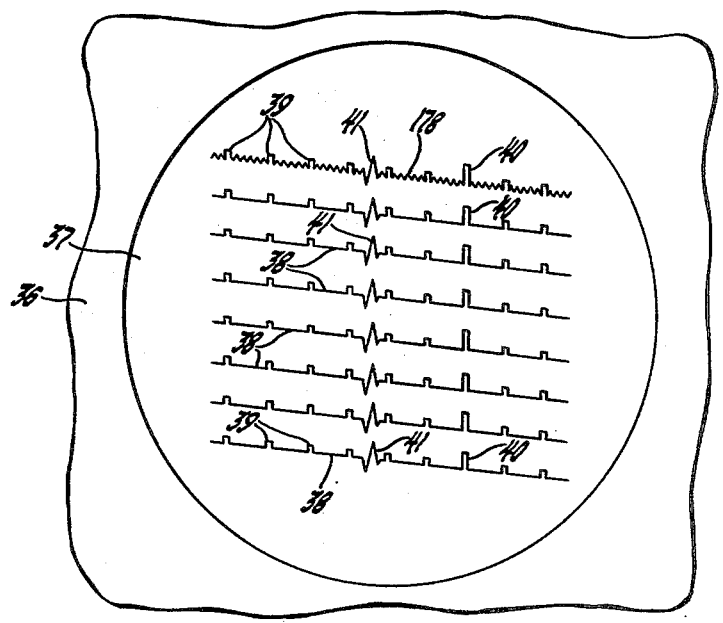
Fig. 6
Inventors
Walter E. Sargeant &
Edward F. Weller, Jr.
Willits, Helwig & Bailie
Attorneys

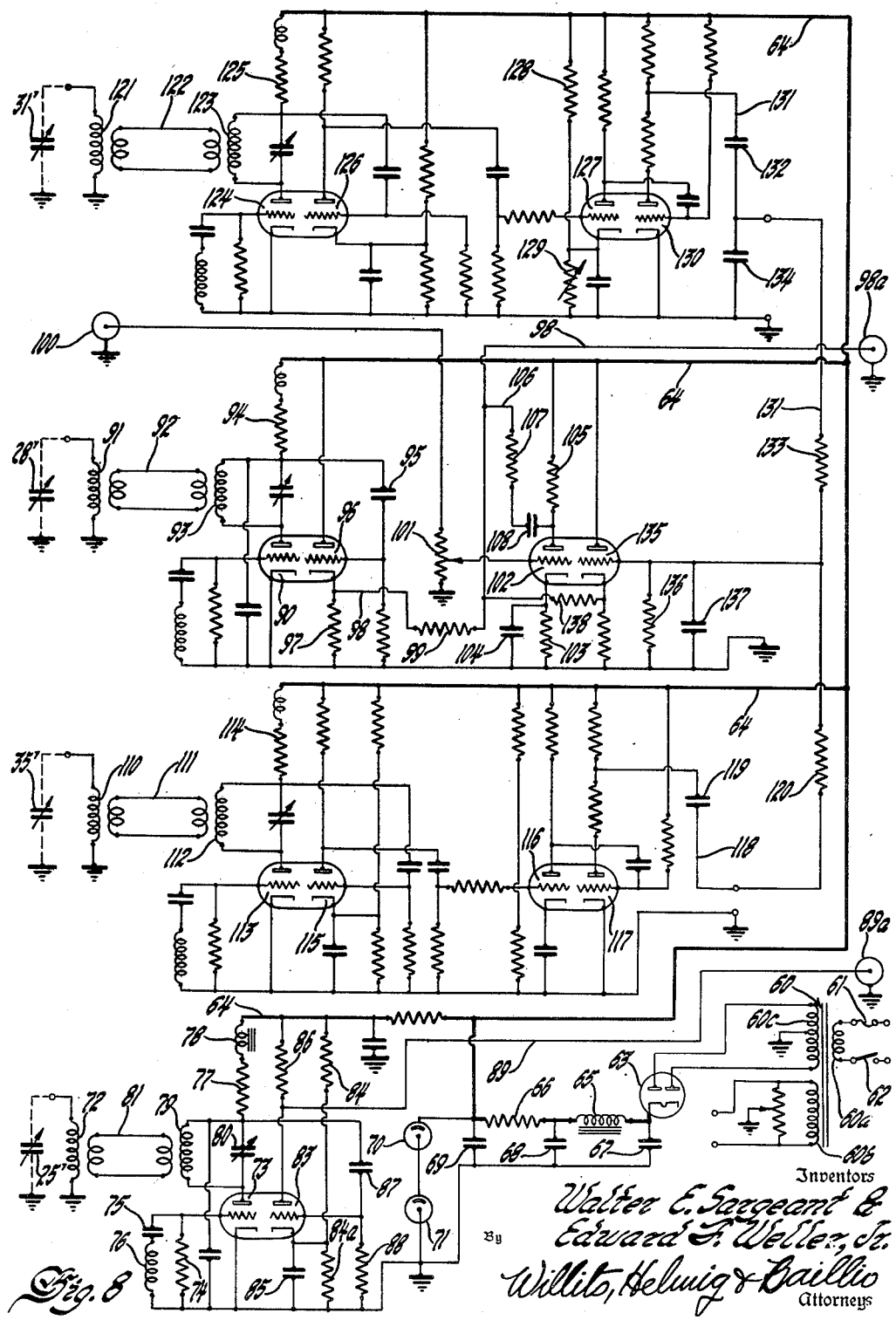

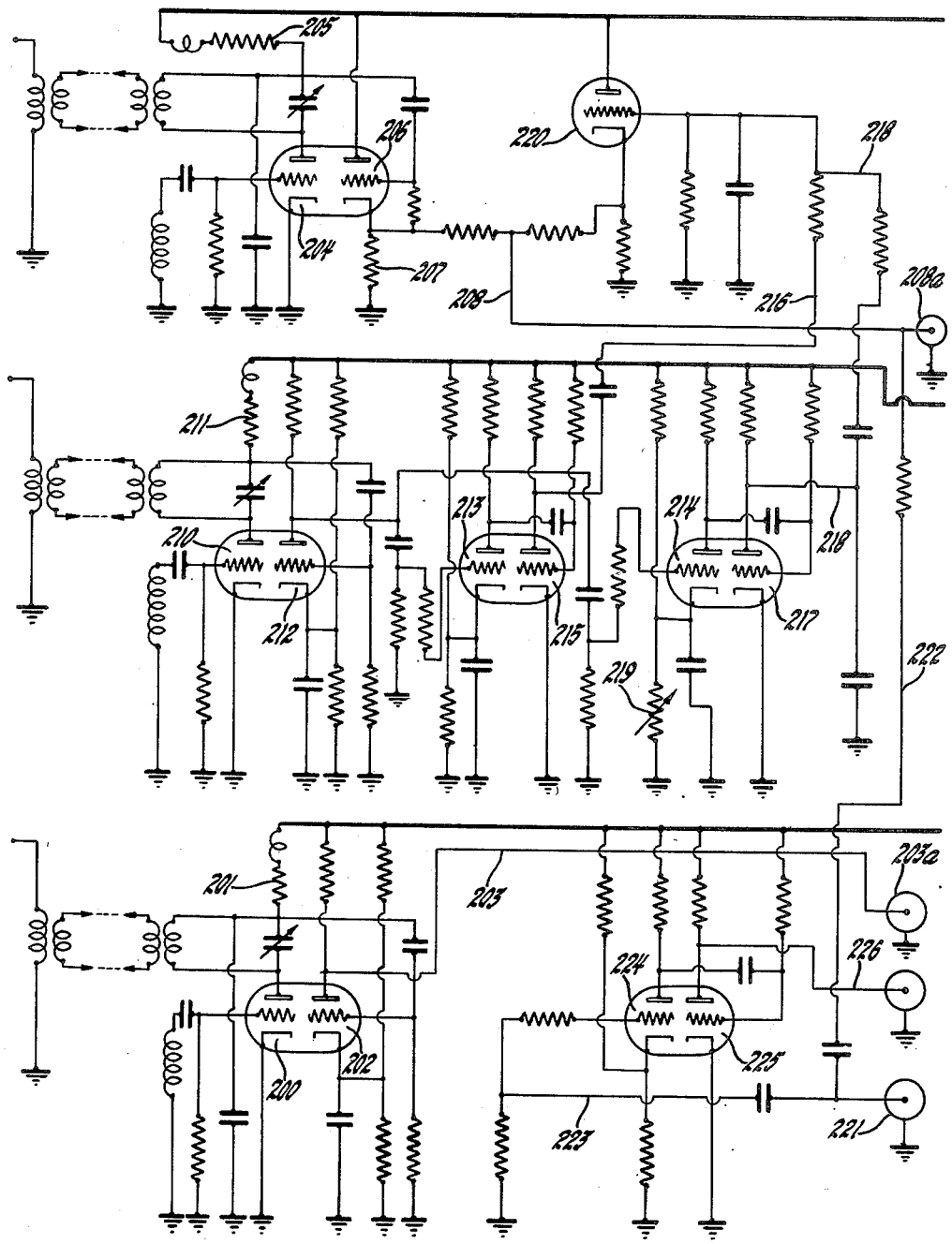

Patented Aug. 31, 1954

2,688,127

UNITED STATES PATENT OFFICE 2,688,127

COMBINED SPARK IMPULSE INDICATOR

Walter E. Sargeant, Huntington Woods, and Edward F. Weller, Jr., Detroit, Mich., assignors to General Motors Corporation, Detroit, Mich., a corporation of Delaware Application January 30, 1951, Serial No. 208,536

21 Claims. (Cl. 340—268)

1

This invention relates to indicating apparatus and a novel indicating method, and more particularly to apparatus and a method for providing a simultaneous indication of a plurality of sequentially occurring, cyclically repeating voltages, the apparatus being particularly adapted for use as a spark advance indicator for internal combustion engines.

One feature of the invention is that it provides improved apparatus for and a novel method of providing a simultaneous indication of a plurality of sequentially occurring, cyclically repeating voltages; another feature of the invention is that it provides a simultaneous visual indication of the amount of spark advance for each cylinder of a multi-cylinder engine; a further feature of the invention is that the indication of the spark pulse for each cylinder appears along a different sweep trace on the face of an oscilloscope; still another feature of the invention is that marking pulses are provided to indicate the number of degrees of spark advance for each cylinder; yet a further feature of the invention is that a timing pulse is provided in connection with each cylinder to indicate a predetermined position in a cycle of operation thereof, as, for example, top dead center position; still another feature of the invention is that the sweep voltages are developed mechanically by rotatable cams having saw-tooth shaped conducting lobes and conductor means adjacent said lobes for providing capacitances which vary in accordance with the shape of said lobes upon rotation of said cams; yet a further feature of the invention is that an alternating voltage wave of known frequency may be utilized to modulate one of the sweep traces to provide an indication of engine speed; an additional feature of the invention is that means are provided for synchronizing the apparatus with a shutterless motion picture camera to provide a permanent record of the indication, including means for cyclically blanking the indication; and still an additional feature of the invention is that means are provided for strenghtening the visual indication during the occurrence of the sequentially occurring voltages.

Figure 2:
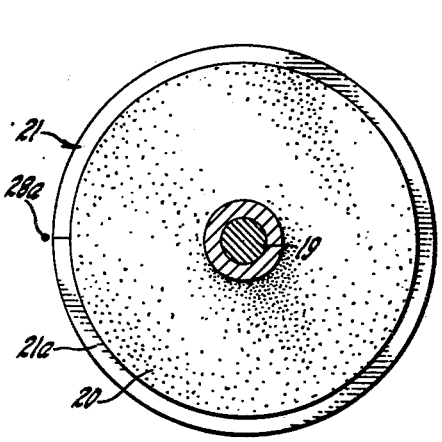
Figure 3:
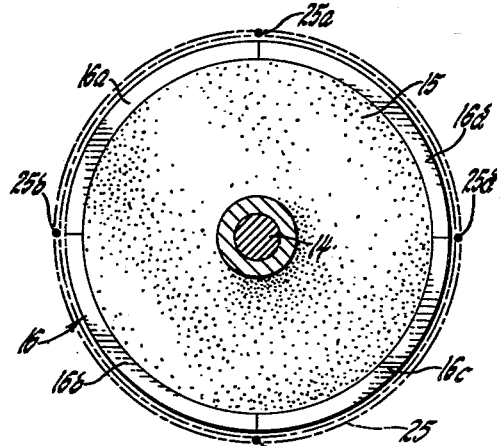

Other features and advantages of the invention will be apparent from the following specification taken in connection with the drawings, in which:

Figure 1 is a side elevational view of the pickup apparatus, showing the cams for developing the sweep voltages; Figure 2 is a transverse section along the line 2—2 of Figure 1; Figure 3 is a

Figure 7:
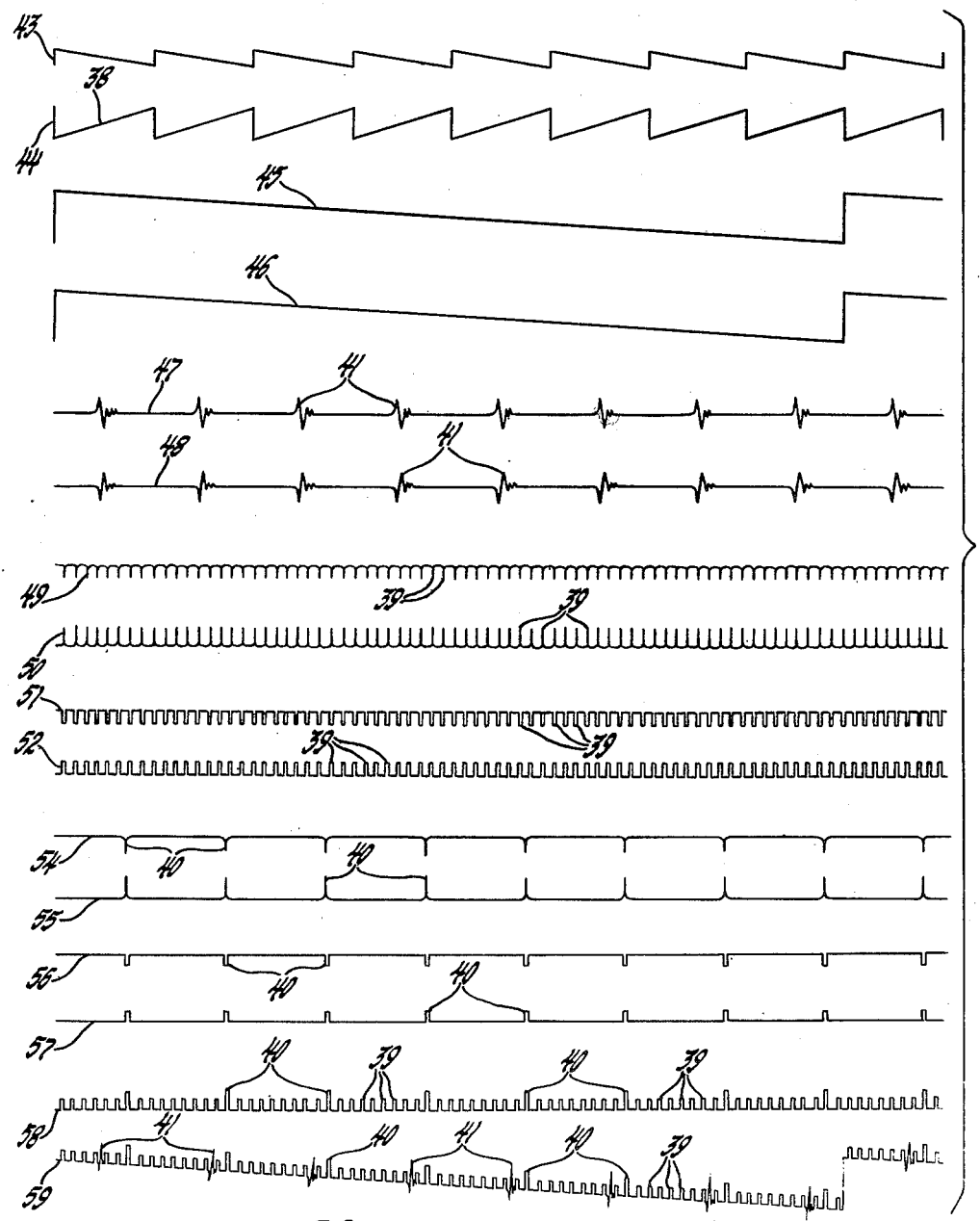

2 transverse section along the line 3—3 of Figure 1; Figure 4 is a diagrammatic view of the means for blanking the visual indication and for synchronizing the operation of a motion picture camera with the system; Figure 5 is a diagrammatic view of the means for injecting an alternating voltage of known frequency for providing an indication of engine speed; Figure 6 is a fragmentary front elevational view of an oscilloscope showing the indication which the apparatus provides for indicating the degrees of spark advance for each cylinder of an eight cylinder engine; Figure 7 is a timing chart showing wave forms taken at various points in the circuit of Figure 8; Figure 8 is a schematic diagram of a preferred circuit for the apparatus; and Figure 9 is a schematic diagram of a modified circuit for the apparatus.

Many attempts have been made to provide a spark advance indicator which would provide a visual indication of the amount of spark advance in the various cylinders of an internal combustion engine, as, for example, an automobile engine. In the past, most of these devices utilized a flashing light which was rotated, generally at crankshaft speed, and which provided a stroboscopic effect against a protractor background. Such devices generally would only provide an indication of the spark advance of a single cylinder at any one time, and in addition such devices were particularly disadvantageous in that in order to utilize the device it was necessary to remove the distributor from the engine.

Other devices have been developed to provide a visual indication on a meter. The spark which causes the ignition ordinarily precedes top dead center position of the piston by several degrees, this angle or time difference being known as the spark advance angle of the engine. In this type of spark advance indicator the time is measured between the spark impulse and the time when the cylinder reaches top dead center position and this time period is compared with the time from top dead center position to the next spark impulse. This is done by using an electronic switch which is closed by the spark impulse and opened when the piston reaches top dead center position. During the closure time a current of regulated amplitude is allowed to flow, and the time during which the current flows, when compared to the total time of a cycle or with the time when no current flows, determines the degrees of spark advance. Obviously this method depends for its accuracy upon many factors such as the quality of the meter, the regulation of the vacuum tubes or other means for determining current flow, and the like.

The apparatus of the present invention provides a superior type of indication in that it simultaneously indicates the spark impulse for each cylinder of a multi-cylinder engine. In the improved apparatus means are provided for developing a first sweep voltage equal in frequency to the repetition rate of the spark in one cylinder multiplied by the number of cylinders in the engine. This sweep appears on the oscilloscope as a plurality of horizontal sweep traces. Means are also provided for developing a second sweep voltage equal in frequency to the spark repetition rate in one cylinder. This second sweep is utilized to obtain scanning lines so that there are a plurality of horizontal sweep lines, one for each engine cylinder. Circuit connections between the vertical sweep voltage developing means and the spark source provide means for modulating each cycle of the second or vertical sweep with a spark impulse from one cylinder, and, inasmuch as a combined indication is provided on the face of an oscilloscope, the operator sees a plurality of horizontal sweep lines arranged in conventional scanning steps, and upon each horizontal sweep line is an indication of the spark impulses from one cylinder of the engine.

In addition to showing the spark impulse, we provide marking pulses which may indicate any predetermined number of degrees of engine revolution along each sweep line, as, for example, 10° marker pips. In order properly to locate the time of spark impulse with reference to a known point in the operation of the engine, we provide timing impulses which are of different conformation from the marking impulses and which may be used to indicate top dead center or any other predetermined position in a cycle of operation of each one of the engine cylinders. In addition, means are provided for injecting an alternating voltage of known frequency in order to provide an indication of engine speed, and means are also provided for synchronizing the operation of a motion picture camera with the operation of the system and for blanking the oscilloscope indication cyclically in synchronization with the operation of the camera. In the form of the invention shown in Figure 9, means are provided for strengthening or brightening the oscilloscope trace during the occurrence of the spark impulses.

As disclosed herein, the sweep voltages are mechanically developed. In the co-pending application of Edward F. Weller, Jr., filed January 30, 1951, as Serial No. 208,519, a somewhat similar indicating system is disclosed and claimed in which the indicating voltages are electronically developed in circuits controlled by triggering pips. Claims to the basic invention are included in the present application.

While the invention will be described as a spark advance indicator, it should be understood that it is applicable to many other uses. For example, instead of indicating spark impulses, the sequentially occurring, cyclically repeating voltages which are indicated by the device might be obtained as a function of pressure variations in a cylinder, or as a function of any other repeating phenomenon. Among the engine characteristics which may be determined by the apparatus and method herein disclosed are the following: spark timing for each cylinder; tolerance and variation of cams and contact breakers; transient spark advance variations due to friction; vacuum advance changes while accelerating; instantaneous spark timing and variation; or, when desired any other variables such as vibration or noise can be displayed in terms of engine degrees with one degree accuracy.

Referring now more particularly to the drawings, in Figure 1 the pickup apparatus is mounted in a stand having a base 10, end walls 11 and 12, and a partition 13 intermediate said end walls. A shaft 14 is rotatably mounted to extend through the end wall 12, the outer end of the shaft being adapted to be coupled to the crankshaft of the engine under test. Preferably an airplane type double-universal joint is utilized to connect the shaft 14 with the crankshaft of the engine under test. Fixed to the shaft 14 by means of a sleeve 15a is a cylindrical member 15 of electrically insulating material, as, for example, formica. A cam sleeve 16 of conducting material, as brass, is pressed on the cylinder 15, the sleeve 16 having four similar saw-tooth shaped cam lobes 16a, 16b, 16c and 16d, each lobe defining an angle of 90° around the periphery of the sleeve 16. The sleeve 16 is grounded to the supporting stand, preferably through the sleeve 15a and shaft 14. At its rear end the shaft 14 carries a gear 17 which meshes with a gear 18 on a shaft 19 rotatably mounted in the end wall 11 and the partition 13. A cylindrical body member 20 of electrically insulating material is fixed on the shaft 19 by means of a sleeve 19a, and a conductive cam sleeve 21 of brass or the like is pressed on the member 20. The sleeve 21 has a single saw-tooth cam lobe 21a, which extends entirely around the periphery of the sleeve 21, as shown in Figure 1, and the cam sleeve 21 is also grounded.

During the operation of the engine the cam 16 is rotated at crankshaft speed so that each of the four lobes 16a–d passes any given point twice during each complete engine cycle to provide an indication for each cylinder of an eight cylinder engine. Because of the reduction gearing the cam 21 is rotated at one-half crankshaft speed, so that the single lobe 21a passes a given point only once during each complete engine cycle.

Conductor means are positioned adjacent each lobe of the cam 16, this means comprising a wire 25 mounted in a bracket 26 on the end wall 12 and insulated therefrom by a sheet of insulating material 27. The wire has four equally spaced radial spokes 25a, 25b, 25c and 25d which extend parallel to and closely adjacent the surface of the respective cam lobes 16a–d. The spokes are positioned 90° apart and are electrically connected together. While only a single spoke could be used if desired, utilizing four equally spaced spokes, one positioned adjacent each of the four cam lobes, with all of the spokes connected together, eliminates the effect of irregularities and variations in conformation of the different cam lobes, thereby providing an average capacitance which is the same for each cylinder of the vehicle under test. A conductor 28 has a spoke 28a adjacent the single lobe 21a of the cam 21, this spoke extending closely adjacent and parallel to the surface of the lobe. The conductor 28 is mounted in a bracket 29 on the partition 13, the conductor being electrically insulated from the partition 13 by a sheet of insulating material 30.

These cams are utilized to provide saw-tooth shaped capacitive effects from which are developed sweep voltages. Inasmuch as the four-lobed cam 16 rotates at crankshaft speed, eight indications or sweep voltage traces may be developed during each complete engine cycle. Inasmuch as the single lobed cam 21 rotates at one half crankshaft speed, only a single sweep voltage trace will be developed during each engine cycle.

In order to provide timing impulses comprising a plurality of cyclically repeating pips, each indicating a predetermined position in a cycle of operation of one of the cylinders of the engine under test, a pickup member 31 is mounted in an insulating support 32 carried by a bracket 33 bolted to the top of the partition 13. The member 31 acts as a capacitive pickup in cooperation with a plurality of pins 34 which project from the face of the gear 18. Inasmuch as the gear 18 rotates at one half crankshaft speed, there should be eight pins 34 equally spaced on the face of the gear in a position to pass closely adjacent the pickup member 31 as the gear rotates. The angular position of the pins 34 will determine the position of the timing pips in a cycle of operation of the cylinders. Preferably the pins are so arranged that one passes closely adjacent the pickup member 31 each time one of the cylinders is in top dead center position.

Marking voltage impulses comprising a plurality of cyclically repeating equally spaced pips having a repetition rate equal to a predetermined number of degrees in a cycle of operation of the engine under test may be provided by a capacitive pickup comprising a pickup member 35 positioned closely adjacent the path of movement of the teeth 18a of the gear 18. The pickup member 35 is carried on the support 32 closely adjacent the gear teeth 18a and in the plane of rotation thereof. The marking impulses which are developed as the gear teeth 18a pass closely adjacent the pickup member 35 may provide an indication of degrees in a cycle of operation in the engine, and while any number of gear teeth may be utilized, preferably the teeth are so proportioned that the marking impulses are spaced ten degrees from each other along the sweep lines, thus providing a ready reference to determine the number of degrees of spark advance. Inasmuch as the gear 18 rotates at one half crankshaft speed, if there are 72 teeth on the gear the marker pips will be spaced from each other in an amount to indicate each ten degrees of engine revolution.

Figure 6 shows the face of a cathode ray oscilloscope tube providing a combined indication of all of the impulses while the apparatus is in operation. The front panel 36 of the oscilloscope has an opening through which the face 37 of the cathode ray tube may be seen. The sweep voltages developed as a function of passing the cam lobes 16a–d closely adjacent the conductors 25a–d appear as horizontal sweep traces 38. The marking impulses developed as a function of passing the teeth 18a closely adjacent the pickup member 35 appear as a plurality of cyclically repeating equally spaced pips 39 having a repetition rate such that the space between the leading edge of one pip and the leading edge of the adjacent pip represents a predetermined number of degrees of engine revolution—10° in the apparatus illustrated. The timing impulses developed as a function of passing the pins 34 closely adjacent the pickup member 31 are shown at 40, these impulses being superimposed upon certain of the marking impulses to indicate a predetermined position, as top dead center, in the cycle of operation of each engine cylinder.

The spark impulse which is to be indicated is shown at 41, this spark impulse occurring in advance of top dead center position in the diagram of Figure 6. Any suitable means may be used to provide a spark impulse from each cylinder, as, for example, an induction type pickup similar to that shown in Patent No. 2,471,968 which issued May 31, 1949, to J. D. McCullough, or a pickup of the type disclosed in the co-pending application of Walter E. Sargeant and Edward F. Weller, Jr., filed November 21, 1950, as Serial No. 196,882. In the apparatus of the present invention, a spark pickup would be associated with the lead from coil to distributor and the impulses provided by each spark pickup will appear at some point along the corresponding horizontal sweep traces to indicate the number of degrees of spark advance of each cylinder of the engine.

It should be noted that the indication illustrated in Figure 6 provides a simultaneous indication of all of the engine cylinders and that the indication is "dynamic" in the sense that it instantaneously shows the present operating conditions in the cylinder. The indication is continuous as long as the engine is running, and the indication may readily be photographed to provide a permanent record if desired.

From the details of Figure 6 it will be obvious that the apparatus and method of the invention may be utilized to provide a simultaneous indication of a plurality of sequentially occurring cyclically repeating voltages. While spark impulses are illustrated and described as being a typical use of the invention, cyclically repeating voltages indicative of pressure conditions in the cylinders might be indicated if desired, or an indication might be provided of any other sequentially occurring, cyclically repeating voltages indicative of any cyclically recurring phenomenon. With different cam arrangements different engines may be tested, regardless of the number of cylinders. For example, for testing a six cylinder engine, three cam lobes could be utilized or six cam lobes could be used and rotated at one-half crankshaft speed.

Figure 8 is a schematic diagram of the circuits utilized to provide the indications shown in Figure 6 from the impulses developed by the apparatus of Figure 1 and from the spark impulses. Figure 7 is a timing chart showing the wave forms which appear at various points in the circuit of Figure 8. In Figure 7, 43 represents the wave form of the horizontal sweep, being a representation of the plate current in the anode circuit of tube 73. 44 represents the horizontal sweep voltage in the anode circuit of tube 83. 45 represents the wave form of the vertical sweep, being a representation of the plate current in the anode circuit of tube 90; 46 represents the vertical sweep voltage in the cathode circuit of the tube 96. 47 represents the spark input at the grid of tube 102; 48 represents the voltage of that portion of the anode circuit of tube 102 which is developed across the resistor 107. 49, 50, 51 and 52 are all diagrammatic representations of the development of the marker pips 39, 49 representing the anode current of tube 113; 50 representing the anode voltage of tube 115; 51 representing the anode voltage of tube 116 and 52 representing the anode voltage of tube 117. 54, 55, 56, and 57 show the development of the timing pulses 40, 54 representing the anode current of tube 124; 55 representing the anode voltage of tube 126; 56 representing the anode voltage of tube 127; and 57 representing the anode voltage of tube 130. 58 represents the grid (and cathode) voltage of mixing tube 135; and 59 represents the modulated vertical sweep voltage at terminal 98a of Figure 8.

In the description of the circuits and their operation, the electrical apparatus will be divided into basic components including:

A. Power supply
B. Horizontal sweep generator
C. Vertical sweep generator
D. Spark input circuit
E. Marker signals
F. Timing signals
G. Mixing circuits
H. Recording and timing apparatus
I. Modified circuit.

A. *Power supply*

A power transformer designated generally at 60 has a primary 60a which is adapted to be connected to a source of voltage, as, for example, a conventional commercial 110 volt source, through a fuse 61 and an on-off switch 62. A filament secondary 60b is provided in conventional manner, and the transformer 60 has a power secondary 60c having a grounded center tap, and having its opposite ends connected to the plates of a full wave rectifier tube 63, which may be of tube type No. 6X5. The B plus voltage from the cathode of this tube is supplied to B plus lead 64 through a filter arrangement comprising a choke 65 which may have a value of 10 henries, a resistor 66 which may have a value of 1500 ohms, and condensers 67, 68 and 69 which are connected to ground in conventional manner, and which each may have a value of 16 microfarads. In order to provide voltage regulation, series connected regulator tubes 70 and 71 may be connected across the B plus circuit. These tubes may respectively be of tube type VR-105 and VR-150.

B. *Horizontal sweep generator*

The cam lobes 16a–d and conductors 25a–d function as a capacitive pickup. As the cam lobes 16a–d rotate past the parallel connected conductors 25a–d, the capacitive effect will vary in accordance with the shape of said lobes. In Figure 8 the variable capacitance between the cam lobes (which are grounded) and conductors 25a–d is indicated in broken lines and is designated 25'. The conductor 25 is connected to an inductance 72 and the other end of this inductance is grounded so that the capacitance 25' and inductance 72 form a series circuit which is resonant at frequencies which vary in accordance with the variations in said capacitance—i. e., a graph of the resonant frequency of such circuit would be of saw-tooth form.

An oscillator is associated with the series circuit above described and comprises a triode tube 73 (which may comprise one half of a 6SL7 tube envelope). The cathode of the tube 73 is grounded. The grid circuit includes a resistor 74 which may have a value of 25,000 ohms, a condenser 75 which may have a value of 300 micromicrofarads and an inductance 76, the elements 75 and 76 being connected in parallel with the resistor 74. The anode of the tube 73 is connected to B plus lead 64 through a detecting or load resistor 77 which may have a value of 10,000 ohms, and a choke 78. The anode circuit incorporates an LC tank circuit comprising an inductance 79 and a capacitance 80. The inductances 76 and 79 are magnetically coupled to provide sufficient feedback from the anode to the grid to cause the tube to oscillate. The LC circuit of the tube is coupled to the inductance 72 by means of a link-coupling device 81. As the capacitance 25' varies, the impedance reflected to the oscillator varies accordingly, as disclosed in detail in the co-pending application of Wesley R. Erwin, filed November 4, 1946, as Serial No. 707,736. While the condenser 80 is made variable for purposes of initial adjustment during operation of the device, the value of this condenser remains fixed.

The oscillator circuit components are so proportioned that the saw-tooth resonant frequency of the series circuit comprising the capacitance 25' and the inductance 72 falls on a substantially linear portion of the oscillator output curve. If the series circuit resonant frequency saw-tooth wave falls on the leading slope of the oscillator output curve, the sweep which is developed will move in one direction across the oscilloscope screen; while if said saw-tooth wave falls on the trailing slope of the oscillator output curve the sweep will move in the other direction.

The varying impedance reflected into the oscillator LC circuit changes the loading of the oscillator and causes the oscillator anode voltage and current to vary as a function of and in accordance with the variations in the capacitance 25', these variations appearing as saw-tooth shaped voltage variations across the resistor 77.

An amplifier tube 83 is shown as being contained in the same envelope as the tube 73. In the circuit illustrated dual tubes may conveniently be employed throughout, and in each case the separate functional tube parts will be referred to as a tube, despite the fact that more than one tube may be housed in the same envelope. The tube 83 has its cathode connected to a voltage divider comprising resistors 84 and 84a which may have respective values of 60,000 ohms and 5,000 ohms. One end of resistor 84a is grounded and this resistor is by-passed for A. C. by a condenser 85 which may have a value of 8 microfarads. The anode of the tube 83 is connected to the B plus lead 64 through a dropping resistor 86 which may have a value of 200,000 ohms, and the grid of the tube 83 is coupled to one end of the detecting resistor 77 through a coupling condenser 87 which may have a value of 1 microfarad and a grid resistor 88 which may have a value of 500,000 ohms. The anode of the tube 83 is connected through a lead 89 to a terminal 89a which may be the horizontal sweep terminal of an oscilloscope, as a Du Mont type 208B oscilloscope, or the like. The voltage wave form at terminal 89a is shown in Figure 7 at 44.

C. *Vertical sweep generator*

The vertical sweep voltage is generated by an oscillator comprising a tube 90 and associated circuits which are similar to those disclosed above in connection with tube 73 and which will therefore not again be described in detail. Capacitive impulses of saw-tooth wave form are developed by the single lobe cam 21 (which is grounded) and the adjacent conductor 28 as the cam rotates. This variable capacitance is designated in broken lines at 28', and the conductor 28 is connected to an inductance 91 to form a series circuit, the resonant frequency of which varies in a saw-tooth manner through a range lying on the resonance slope of the oscillator. A link-coupling device 92 couples the inductance 91 with an inductance 93 which forms part of the LC circuit for the oscillator. Variations in the reflected impedance in the LC circuit cause variations in the oscillator load, and these variations are detected across a resistor 94 and coupled through a condenser 95 into the grid circuit of the tube 96 which is arranged as a cathode follower, having a resistor 97 which may have a value of 36,000 ohms connected between its cathode and ground. A lead 98 is connected to the cathode side of the resistor 97 and extends to a terminal 98a which may have the vertical sweep terminal of the oscilloscope. The lead 98 incorporates a resistor 99 which may have a value of 15,000 ohms. The voltage at terminal 98a is shown in Figure 7 at 46. If desired the vertical sweep voltage might be obtained from across a cathode load resistor in the cathode circuit of tube 90, thus eliminating the cathode follower 96 and associated components.

D. *Spark input circuit*

A spark input terminal 100 may be connected to a plurality of spark pickups associated with the various spark plugs of the engine as earlier described. This terminal is connected through the variable tap of a potentiometer 101 to the grid of an amplifier tube 102. The wave shape is shown in Figure 7 at 47. The cathode of this tube is connected to ground through a resistor 103, which may have a value of 30,000 ohms, and is by-passed by a condenser 104, which may have a value of 8 microfarads. The anode of the tube is connected to the B plus lead 64 through a resistor 105, which may have a value of 100,000 ohms, and a small portion of the output signal (shown in Figure 7 at 48) is resistance mixed with the vertical sweep in a circuit including a lead 106 connected between the anode of tube 102 and lead 98. Lead 106 incorporates a resistor 107, which may have a value of 1 megohm, and a condenser 108, which may have a value of .05 microfarad. In the event the apparatus is used for testing vibration or pressure signals rather than spark advance, the tube 102 may be used as an amplifier.

E. *Marker signals*

The variable capacitance existing between the gear teeth 18a and the pickup member 35 as the gear 18 rotates is designated in Figure 8 at 35'. The gear 18 is grounded and the pickup member 35 is connected to an inductance 110 to form a series circuit similar in all but resonant frequency to the circuit formed by the capacitance 25' and the inductance 72. The inductance 110 is coupled by a link-coupling device 111 to an inductance 112 forming part of the LC circuit of an oscillator tube 113. This oscillator and its associated components is similar except in frequency to the oscillator above described in connection with the development of the horizontal sweep. The variations in the oscillator load occasioned by the variable capacitance, which is developed and coupled into the oscillator LC circuit as the gear teeth rotate past the pickup 35, are detected by a resistor 114 and are coupled into the grid circuit of an amplifier tube 115. The anode voltage of this tube is shown in Figure 7 at 50, and this voltage is applied to the grid of tube 116 where the sharp spikes shown in Figure 7 are clipped and inverted, the output wave of the tube being shown at 51 in Figure 7. The clipping level may be adjusted by adjusting the tuning of the oscillator tube 113 to determine the position on the oscillator output curve of the resonant frequency range of the series circuit 35'—110. The output signal of the amplifier tube 116 is coupled to the grid of a tube 117 which is a simple inverter stage, its anode voltage being shown at 52 in Figure 7. Lead 118 connects the marking pulses into a mixing circuit to be hereafter described. The lead 118 incorporates a condenser 119 which may have a value of .05 microfarad and a resistor 120 which may have a value of 750,000 ohms.

F. *Timing signals*

The variable capacitance existing between the pins 34 (which are grounded) and the pickup member 31 is shown schematically in Figure 8 in broken lines at 31'. The pickup member 31 is connected to an inductance 121 to form a series circuit similar to that earlier described in connection with the horizontal sweep. The inductance 121 is coupled by means of a link-coupling device 122 to an inductance 123 in the LC circuit of an oscillator comprising a tube 124 and associated circuits. The oscillator is similar except in frequency to the oscillator described above in connection with the development of the horizontal sweep.

The timing pips, after being detected across a resistor 125, are coupled into the input circuit of a tube 126, the output voltage of this tube being shown at 55 in Figure 7. This signal is applied to a tube 127 which is connected as a clipper-inverter. The clipping action is obtained by providing a threshold bias on the cathode through a voltage divider connected between B plus and ground and comprising a resistor 128, which may have a value of 100,000 ohms, and a variable resistor 129, which may have a maximum value of 10,000 ohms. The threshold or clipping level is adjusted by means of the variable resistor 129. The output signal in the anode circuit of the tube 127 is shown at 56 in Figure 7. This signal is inverted in a tube 130 and appears in the anode circuit of such tube in the form shown at 57 in Figure 7.

A lead 131 connects this signal to a mixing circuit to be hereafter described, this lead incorporating a condenser 132, which may have a value of .05 microfarad, and a resistor 133, which may have a value of 250,000 ohms. A high frequency or transient by-pass is provided by a condenser 134 which may have a value of 330 micromicrofarads and which is connected between ground and the lead 131 at a point between condenser 132 and resistor 133.

G. *Mixing circuits*

The marker pulses and timing pulses are applied to the grid of a mixing tube 135 connected as a cathode follower. In addition to resistors 120 and 133, the grid circuit of the tube 135 includes a resistor 136 which may have a value of 150,000 ohms and which is by-passed for high frequency by a condenser 137 which may have a value of 100 micromicrofarads. As a result of the resistance network the timing pulses are superimposed upon the marker pulses as shown at 58 in Figure 7. The output from the cathode circuit of tube 135 is connected through a resistor 138 to the vertical sweep lead 98 to modulate the sweep voltage with the timing and marker pulses. The composite or modulated sweep voltage with the spark signal mixed therewith is shown at 59 in Figure 7.

The above described apparatus and method for developing a first sweep voltage equal in frequency to the repetition rate of one sequentially occurring voltage under test multiplied by the number of sequentially occurring voltages—i. e., a spark from each cylinder—developing a second sweep voltage equal in frequency to the repetition rate of one of the sequentially occurring voltages—i. e., the repetition rate of the spark in any one cylinder—modulating the second sweep voltage with the sequentially occurring voltages and providing a combined indication of both sweep voltages, results in an improved test indication herein illustrated and described as a spark advance indicator. The test indications from all of the cylinders of a multi-cylinder engine appear simultaneously on the oscilloscope, each cylinder appearing in a separate sweep trace as shown in Figure 6.

H. *Recording and timing apparatus*

If desired, a motion picture camera may be synchronized with the operation of the apparatus to provide a permanent record of the visual indication on the oscilloscope screen. Figure 4 shows schematically an apparatus for synchronizing a camera with the indicating apparatus. A cam 150 may be connected to the shaft 14 through conventional gearing to be rotated at only a fraction of engine speed, as, for example, one thirty-second of engine speed. A breaker mechanism similar to that used in the conventional distributor in an automobile comprises an arm 151 carrying a contact 152 and having a follower 153 for operation by the cam 150. Another contact 154 is closed with contact 152 when the cam is in the position shown and is out of engagement with the contact 152 when the follower 153 rides on the curved portion of the cam surface. A solenoid comprising a coil 155 and a film racking armature 156 is connected through the normally open relay contacts 157 across a battery comprising portions 158a and 158b. The operating coil 157a for the relay has one terminal connected to an intermediate point on the battery and has the other terminal connected to the contact 152 through the breaker arm 151. The contact 154 is connected to the battery to complete the circuit.

When the cam 150 rotates to the position shown the contacts 152 and 154 will be closed, energizing the relay and closing the contacts 157. Closure of these contacts connects the solenoid coil 155 across the battery to energize the solenoid and cause its armature to rack the film ahead one frame. The cam 150 may be arranged to cause the film to be racked ahead one frame for any desired number of engine revolutions.

In order to avoid the necessity of utilizing a shutter on the camera, which would have to be synchronized with the operation of the indication apparatus, the indication on the oscilloscope is blanked out for all but one engine revolution during the film racking cycle above described. This blanking apparatus comprises a cam 160 which is operated in synchronism with the cam 150. A breaker arm 161 carries a contact 162 and a follower 163. The contact 162 cooperates with the contact 164 which is connected to a battery 165. The other side of the battery is connected to one terminal of a relay coil 166a, the other terminal of which is connected to the breaker arm 161. The normally closed relay contacts 166 are connected to terminals 167 which may be the blanking terminals of the oscilloscope. In the event blanking terminals are not provided on the oscilloscope a source of negative voltage may be applied through the contacts 166 to the appropriate electrode of the cathode ray tube in the oscilloscope to blank the beam.

When the cam 160 causes the breaker points 162—164 to open, the relay is energized and the blanking voltage is removed. The cam is so arranged that the oscilloscope is blanked for all but one engine cycle (two crankshaft revolutions) during the blanking cycle. This construction makes it possible to eliminate the shutter on the camera and also saves film, inasmuch as only one engine revolution out of 32 is filmed.

Since the indication on the oscilloscope has the same appearance at all engine speeds, it is desirable to inject a wave of known frequency into one of the sweep traces so that the time between the 10° marker pulses, and consequently the engine speed, can be determined. An apparatus for accomplishing this is shown in Figure 5. A cam 170 is connected to the apparatus of Figure 1 so that it is rotated at one-half engine speed. For example, this cam may be on the shaft 19. The cam has a surface portion 170a so proportioned that it will operate a follower for one-eighth of an engine cycle—i. e., for the time duration of one of the horizontal sweep traces shown in Figure 6. A breaker arm 171 carries the contact 172 and a follower 173 engaging the surface of the cam 170. The contact 172 is adapted to engage a contact 174, and these contacts are connected through terminals 175 to the output of an oscillator for developing a wave of known frequency. For example, a commercially obtainable Hewlitt Packard Audio Oscillator might be utilized and might be tuned to any desired frequency, as, for example, 6000 C. P. S. The primary of a transformer 176 is connected in the lead between the contact 174 and the terminal 175. The secondary of this transformer has one end grounded and the other end coupled through a condenser 177 to the vertical sweep terminal of the oscilloscope. When the cam is in the position illustrated so that the contacts 172 and 174 are closed, an alternating current voltage wave of constant and known frequency is injected into the vertical sweep. When the cam rotates sufficiently to open the contacts 172 and 174, the transformer circuit is broken. This known frequency wave is shown at 178 in Figure 6. While the wave might be applied to each horizontal sweep trace, the cam 170 is preferably arranged so that the wave is applied to only one sweep trace during each engine cycle.

I. *Modified circuit*

A modified circuit is shown in Figure 9. This circuit is substantially similar to the circuit of Figure 8, with the additional provision that in Figure 9 means are provided for strengthening or brightening the indication during the occurrence of the spark impulses.

In Figure 9 the horizontal sweep circuit is exactly similar to the horizontal sweep circuit in Figure 8. A capacitive impulse of saw-tooth form is coupled into the output circuit of an oscillator tube 200 to change the loading thereof, this change in loading is detected across a resistor 201 and the saw-tooth wave is inverted in a tube 202, the output of which is applied through a lead 203 to the horizontal sweep terminal 203a.

The vertical sweep circuits are similar to those shown in Figure 8, and include an oscillator tube 204, a detecting resistor 205 and a cathode follower tube 206 having a cathode resistor 207 across which the vertical sweep voltage is taken. A lead 208 applies this voltage to the vertical sweep terminal 208a.

In Figure 9 the timing signals may be superimposed upon the marking signals since both are applied to the same portion of the circuit. If desired the timing and marking signal pickups may be connected in parallel. The combined signals are utilized to change the loading of an oscillator tube 210 in the same manner as is done in the separate circuits of Figure 8, and the signals are detected across a resistor 211 and applied to an inverter tube 212. The output of the inverter tube 212 is applied to the grid of a clipper tube 213 and also to the grid of a threshold amplifier and clipper 214. The output of the clipper 213 is applied to the input of an inverter stage 215 and the clipped output of this stage is applied through a lead 216 to a mixing circuit.

The threshold amplifier 214 eliminates the marking pulses and the remaining timing pulses are applied through an inverter tube 217 to the mixing circuits through a lead 218. The threshold level may be set by means of a variable resistor 219 in the cathode circuit of the tube 214. It is necessary to separate the timing and marking pulses in order that the pulses may be clipped and formed into the square waves. The tube 213 cannot distinguish between the pulses, and therefore it is necessary to preserve the identity of the timing pulses by the tubes 214 and 217, even though the timing and marking pulses, after being formed into square waves are again mixed. This mixing is done in a stage 220 connected as a cathode follower. The output of the stage 220 is mixed with the vertical sweep in the lead 208 to modulate said sweep with the timing and marker pulses.

The spark input is received through a terminal 221, a portion of this input being applied through a lead 222 to the vertical sweep voltage circuit. Another portion of the spark input is applied through a lead 223 to the grid of a clipper tube 224, the output of this tube being inverted in a tube 225 to provide a positive pulse in the output lead 226. This positive pulse, which occurs simultaneously with the spark pulse, may be connected to the proper anode of the oscillator to brighten the sweep trace during the occurrence of the spark pulse.

While we have shown and described one embodiment of our invention, it is subject to many modifications. Changes, therefore, in the construction and arrangement may be made without departing from the spirit and scope of the invention as set forth in the appended claims.

We claim:

1. Apparatus of the character described for providing a simultaneous indication of a plurality of sequentially occurring cyclically repeating voltages, including: means for developing a first sweep voltage equal in frequency to the repetition rate of one of said sequentially occurring voltages multiplied by the number of sequentially occurring voltages; means for developing a second sweep voltage equal in frequency to the repetition rate of one of said sequentially occurring voltages; circuit connections between said second sweep voltage developing means and the sources of said sequentially occurring voltages providing means for modulating said second sweep voltage with said sequentially occurring voltages; and means for providing a combined indication of said first and second sweep voltages.

2. Apparatus of the character claimed in claim 1, wherein the means for developing said sweep voltages comprise rotatable cams having at least one saw-tooth shaped conducting lobe, and conductor means adjacent said lobes for providing a capacitance which varies in accordance with the shape of said lobes upon rotation of said cams.

3. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; means for developing a first sweep voltage equal in frequency to the repetition rate of one of said sequentially occurring voltages multiplied by the number of sequentially occurring voltages; means for developing a second sweep voltage equal in frequency to the repetition rate of one of said sequentially occurring voltages; circuit connections between said second sweep voltage developing means, the means for developing said marker pips and the sources of said sequentially occurring voltages, said connections providing means for modulating said second sweep voltage with said marker pips and with said sequentially occurring voltages; and means for providing a combined indication of said first and second sweep voltages.

4. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; mechanical means for developing a substantially linear electrical impulse for providing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; mechanical means for developing a substantially linear electrical impulse for providing a second sweep voltage equal in frequency to the repetition rate of one of said sequentially occurring voltages; circuit connections between said second sweep voltage development means, the means for developing said marker pips, the means for developing the timing pips and the sources of said sequentially occurring voltages, said connections providing means for modulating said second sweep voltage with said marker pips, said timing pips and with said sequentially occurring voltages; and means for providing a combined indication of said first and second sweep voltages.

5. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; mechanical means for developing a substantially linear electrical impulse for providing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; mechanical means for developing a substantially linear electrical impulse for providing a second sweep voltage equal in frequency to the repetition rate of one of said sequentially occurring voltages; circuit connections between said second sweep voltage developing means, the means for developing said marker pips, the means for developing the timing pips and the sources of said sequentially occurring voltages, said connections providing means for modulating said second sweep voltage with said marker pips, said timing pips and with said sequentially occurring voltages; means for providing a combined indication of said first and second sweep voltages; and means for strengthening said indication during the occurrence of said sequentially occurring voltages.

6. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; mechanical means for developing a substantially linear electrical impulse for providing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; mechanical means for developing a substantially linear electrical impulse for providing a second sweep voltage equal in frequency to the repetition rate of one of said sequentially occurring voltages; circuit connections between said second sweep voltage developing means, the means for developing said marker pips, the means for developing the timing pips and the sources of said sequentially occurring voltages, said connections providing means for modulating said second sweep voltage with said sequentially occurring voltages; means for modulating one of said sweep voltages with an alternating voltage of known frequency; and means for providing a combined indication of said first and second sweep voltages.

7. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; mechanical means for developing a substantially linear electrical impulse for providing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; mechanical means for developing a substantially linear electrical impulse for providing a second sweep voltage equal in frequency to the repetition rate of one of said sequentially occurring voltages; circuit connections between said second sweep voltage developing means, the means for developing said marker pips, the means for developing the timing pips and the sources of said sequentially occurring voltages, said connections providing means for modulating said second sweep voltage with said marker pips, said timing pips and with said sequentially occurring voltages; means for modulating one of said sweep voltages with an alternating voltage of known frequency; and means for providing a combined visual indication of said first and second sweep voltages.

8. Apparatus of the character described for providing a simultaneous indication of a plurality of sequentially occurring cyclically repeating voltages; including: means for developing a marking voltage comprising a plurality of cyclically repeating equally spaced pips having a repetition rate greater than the repetition rate of one of said sequentially occurring voltages multiplied by the number of sequentially occurring voltages; means for developing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; means for developing a second sweep voltage equal in frequency to the repetition rate of one of said sequentially occurring voltages, each of said sweep voltage developing means comprising a rotatable cam having at least one saw-tooth shaped conducting lobe, and conductor means adjacent each of said lobes for providing a capacitance which varies in accordance with the shape of said lobes upon rotation of said cams; circuit connections between said second sweep voltage developing means, the means for developing said marker pips, the means for developing the timing pips and the sources of said sequentially occurring voltages, said connections providing means for modulating said second sweep voltage with said marker pips, said timing pips and with said sequentially occurring voltages; cam operated means for modulating one of said sweep voltages with an alternating voltage of constant and known frequency; and means for providing a combined visual indication of said first and second sweep voltages.

9. Apparatus of the character claimed in claim 8, wherein the cam for developing said first sweep voltage has a plurality of saw-tooth shaped lobes, and wherein there is a wire conductor adjacent each lobe, said conductors being electrically connected together.

10. Apparatus of the character described for providing a simultaneous indication of a plurality of sequentially occurring cyclically repeating voltages, including: means for developing a first sweep voltage equal in frequency to the repetition rate of one of said sequentially occurring voltages multiplied by the number of sequentially occurring voltages; means for developing a second sweep voltage equal in frequency to the repetition rate of one of said sequentially occurring voltages; circuit connections between said second sweep voltage developing means and the sources of said sequentially occurring voltages providing means for modulating said second sweep voltage with said sequentially occurring voltages; means for providing a combined visual indication of said first and second sweep voltages; and means synchronized with said second sweep voltage developing means for cyclically blanking said indication.

11. Apparatus of the character claimed in claim 10, wherein said blanking means provide a visual indication of only one of said second sweep voltage cycles during each blanking cycle.

12. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; means for developing a first sweep voltage equal in frequency to the repetition rate of one of said sequentially occurring voltages multiplied by the number of sequentially occurring voltages; means for developing a second sweep voltage equal in frequency to the repetition rate of one of said sequentially occurring voltages; circuit connections between said second sweep voltage developing means, the means for developing said marker pips and the sources of said sequentially occurring voltages, said connections providing means for modulating said second sweep voltage with said marker pips and with said sequentially occurring voltages; means for providing a combined visual indication of said first and second sweep voltages; and means synchronized with said second sweep voltage developing means for cyclically blanking said indication at a rate such that a visual indication is provided of only one of said second sweep voltage cycles during each blanking cycle.

13. Apparatus of the character described for providing a simultaneous indication of a plurality of sequentially occurring cyclically repeating voltages, including: means for developing a marking voltage comprising a plurality of cyclically repeating equally spaced pips having a repetition rate greater than the repetition rate of one of said sequentially occurring voltages multiplied by the number of sequentially occurring voltages; means for developing a first sweep voltage equal in frequency to the repetition rate of one of said sequentially occurring voltages multiplied by the number of sequentially occurring voltages; means for developing a timing voltage comprising a plurality of cyclically repeating pips each indicating a predetermined point in one of said sweep cycles; means for developing a second sweep voltage equal in frequency to the repetition rate of one of said sequentially occurring voltages, each of said sweep voltage developing means comprising a rotatable cam having at least one saw-tooth shaped conducting lobe, and conductor means adjacent each of said lobes for providing a capacitance which varies in accordance with the shape of said lobes upon rotation of said cams; circuit connections between said second sweep voltage developing means, the means for developing said marker pips, the means for developing the timing pips and the sources of said sequentially occurring voltages, said connections providing means for modulating said second sweep voltage with said marker pips, said timing pips and with said sequentially occurring voltages; cam operated means for modulating one of said sweep voltages with an alternating voltage of constant and known frequency; means for providing a combined visual indication of said first and second sweep voltages; and cam operated means synchronized with said second sweep voltage developing means for cyclically blanking said indication at a rate such that a visual indication is provided of only one of said second sweep voltage cycles during each blanking cycle.

14. Apparatus of the character described for providing a simultaneous indication of the spark impulses of a multi-cylinder engine, including: means for developing a first sweep voltage equal in frequency to the repetition rate of the spark in one cylinder multiplied by the number of cylinders; means for developing a second sweep voltage equal in frequency to the repetition rate of the spark in one cylinder; circuit connections between said second sweep voltage developing means and the spark sources providing means for modulating said second sweep voltage with said spark impulses; and means for providing a combined indication of said first and second sweep voltages, the sweep voltage developing means being controlled by the engine during the entire development of the sweep.

15. Apparatus of the character described for providing a simultaneous indication of the spark impulses of a multi-cylinder engine, including: means for developing a timing voltage comprising a plurality of cyclically repeating pips each indicating a predetermined position in a cycle of operation of one of said cylinders; means for developing a first sweep voltage equal in frequency to the repetition rate of the spark in one cylinder multiplied by the number of cylinders; means for developing a second sweep voltage equal in frequency to the repetition rate of the spark in one cylinder; circuit connections between said second sweep voltage developing means, timing voltage developing means and the spark sources, said connections providing means for modulating said second sweep voltage with timing marks and spark impulses; and means for providing a combined indication of said first and second sweep voltages, the sweep voltage developing means being controlled by the engine during the entire development of the sweep.

16. Apparatus of the character described for providing a simultaneous indication of the spark impulses of a multi-cylinder engine, including: means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing a first sweep voltage equal in frequency to the repetition rate of the spark in one cylinder multiplied by the number of cylinders; means for developing a second sweep voltage equal in frequency to the repetition rate of the spark in one cylinder; circuit connections between second sweep voltage developing means, the timing voltage developing means, the means for developing the marker pips and the spark source, said connections providing means for modulating said second sweep voltage with said timing pips, marker pips and spark impulses; and means for providing a combined visual indication of said first and second sweep voltages.

17. Apparatus of the character described for providing a simultaneous indication of the spark impulses of a multi-cylinder engine, including: means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing a first sweep voltage equal in frequency to the repetition rate of the spark in one cylinder multiplied by the number of cylinders; means for developing a second sweep voltage equal in frequency to the repetition rate of the spark in one cylinder; circuit connections between the second sweep voltage developing means, the timing voltage developing means, the means for developing the marker pips and the spark source, said connections providing means for modulating said second sweep voltage with said timing pips, marker pips and spark impulses; means for modulating one of said sweep voltages with an alternating voltage of constant and known frequency; and means for providing a combined visual indication of said first and second sweep voltages.

18. Apparatus of the character described for providing a simultaneous indication of the spark impulses of a multi-cylinder engine, including: means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing a first sweep voltage equal in frequency to the repetition rate of the spark in one cylinder multiplied by the number of cylinders; means for developing a second sweep voltage equal in frequency to the repetition rate of the spark in one cylinder; circuit connections between second sweep voltage developing means, the timing voltage developing means, the means for developing the marker pips and the spark source, said connections providing means for modulating said second sweep voltage with said timing pips, marker pips and spark impulses; means for modulating one of said sweep voltages with an alternating voltage of constant and known frequency; and means synchronized with said second sweep voltage developing means for cyclically blanking said indication at a rate such that a visual indication is provided of only one of said second sweep voltage cycles during each blanking cycle.

19. Apparatus of the character described for providing a simultaneous indication of the spark impulses of a multi-cylinder engine, including: means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing a first sweep voltage equal in frequency to the repetition rate of the spark in one cylinder multipled by the number of cylinders; means for developing a second sweep voltage equal to the repetition rate of the spark in one cylinder, each of said sweep voltage developing means comprising a rotatable cam having at least one saw-tooth shaped conducting lobe, and a wire conductor adjacent each of said lobes for providing a capacitance which varies in accordance with the shape of said lobes upon rotation of said cams, the cam for developing the first sweep voltage having a plurality of saw-tooth shaped lobes and the wire conductors adjacent said lobes being electrically connected together; circuit connections between the second sweep voltage developing means, the timing voltage developing means, the means for developing the marker pips and the spark source, said connections providing means for modulating said second sweep voltage with said timing pips, marker pips and spark impulses; means for modulating one of said sweep voltages with an alternating voltage of constant and known frequency; and means synchronized with said second sweep voltage developing means for cyclically blanking said indication at a rate such that a visual indication is provided of only one of said second sweep voltage cycles during each blanking cycle.

20. Indicating apparatus of the character described for developing a sweep voltage, including: a rotatable cam having at least one saw-tooth shaped conducting lobe; a wire conductor adjacent said lobe for providing a capacitance which varies in accordance with the shape of said lobe upon rotation of said cam; an oscillator; and means for coupling said varying capacitance to said oscillator to vary the output thereof in accordance with said varying capacitance.

21. Indicating apparatus of the character described for developing a sweep voltage, including: a rotatable cam having at least one saw-tooth shaped conducting lobe; a wire conductor adjacent said lobe for providing a capacitance which varies in accordance with the shape of said lobe upon rotation of said cam; an inductance connected in series with said conductor and said lobe to provide a series circuit the resonance of which varies in accordance with the variations in said capacitance; an oscillator having an output circuit which is resonant at a frequency adjacent but displaced from the resonant frequency range of said series circuit; and means coupling said inductance to said output circuit to vary the reflected impedance in said output circuit in accordance with variations in said capacitance.

References Cited in the file of this patent

UNITED STATES PATENTS

| Number | Name | Date |
|---|---|---|
| 2,263,859 | Eldredge | Nov. 25, 1941 |
| 2,355,363 | Christaldi | Aug. 8, 1944 |
| 2,394,196 | Morgan | Feb. 5, 1946 |
| 2,412,350 | Morgan | Dec. 10, 1946 |
| 2,430,154 | Woodward | Nov. 4, 1947 |
| 2,485,343 | Zuschlag | Oct. 18, 1949 |
| 2,525,893 | Gloess | Oct. 17, 1950 |
| 2,608,093 | Traver | Aug. 26, 1952 |